US010254473B2

(12) United States Patent
Matsui

(10) Patent No.: US 10,254,473 B2
(45) Date of Patent: Apr. 9, 2019

(54) LIGHT-EMITTING PANEL

(71) Applicant: MEITAKU INDUSTRY CO., LTD., Shiga (JP)

(72) Inventor: Hirokazu Matsui, Shiga (JP)

(73) Assignee: MEITAKU INDUSTRY CO., LTD., Shiga (JP)

( * ) Notice: Subject to any disclaimer, the term of this patent is extended or adjusted under 35 U.S.C. 154(b) by 0 days.

(21) Appl. No.: 15/311,393

(22) PCT Filed: Jan. 23, 2015

(86) PCT No.: PCT/JP2015/051867
§ 371 (c)(1),
(2) Date: Nov. 15, 2016

(87) PCT Pub. No.: WO2015/174104
PCT Pub. Date: Nov. 19, 2015

(65) Prior Publication Data
US 2017/0115444 A1 Apr. 27, 2017

(30) Foreign Application Priority Data

May 16, 2014 (JP) .................................. 2014-102385

(51) Int. Cl.
F21S 2/00 (2016.01)
F21V 8/00 (2006.01)
G02F 1/1335 (2006.01)

(52) U.S. Cl.
CPC ................ G02B 6/009 (2013.01); F21S 2/00 (2013.01); G02B 6/0051 (2013.01);
(Continued)

(58) Field of Classification Search
CPC .............................. G02B 6/009; G02B 6/0091
See application file for complete search history.

(56) References Cited

U.S. PATENT DOCUMENTS

2009/0009679 A1  1/2009  Ke et al.
2009/0103328 A1*  4/2009  Iwasaki ................ G02B 6/0041
                                                   362/617
(Continued)

FOREIGN PATENT DOCUMENTS

JP  2009-32664 A    2/2009
JP  2010225292 A   10/2010
(Continued)

OTHER PUBLICATIONS

Europan Patent Office, Supplementary European Search Report, Application No. EP 15792805, dated Apr. 5, 2017.
(Continued)

Primary Examiner — Anh T Mai
Assistant Examiner — Zachary J Snyder
(74) Attorney, Agent, or Firm — Quarles & Brady LLP

(57) ABSTRACT

A light-emitting panel of the present invention has a LED, a surface light-emitting member, a light source holder, and a holder supporting portion. The surface light-emitting member has a rectangular plate shape and at least one surface of front and back surfaces is surface-emitted by entering light from the light source into an incident edge. The light source holder holds the LED such that a light exit of the light source is arranged toward the incident edge. The holder supporting portion is fixed to the surface light-emitting member and hold detachably the light source holder. The light-emitting panel of the present invention can reduce effects of the light source due to thermal expansion of the surface light-emitting member, and easily replace the light source.

3 Claims, 7 Drawing Sheets

(52) U.S. Cl.
CPC ......... *G02B 6/0055* (2013.01); *G02B 6/0081* (2013.01); *G02B 6/0085* (2013.01); *G02B 6/0086* (2013.01); *G02B 6/0091* (2013.01); *G02F 1/133608* (2013.01); *G02B 6/0066* (2013.01)

(56) References Cited

U.S. PATENT DOCUMENTS

| | | | |
|---|---|---|---|
| 2011/0037920 A1 | 2/2011 | Kim et al. | |
| 2012/0092890 A1* | 4/2012 | Matsui | G02B 6/0091 362/607 |
| 2014/0184926 A1* | 7/2014 | Shimomichi | H04N 5/645 348/794 |

FOREIGN PATENT DOCUMENTS

| | | | |
|---|---|---|---|
| JP | 2010256813 A | 11/2010 | |
| JP | 2011-096506 A | 5/2011 | |
| JP | 2013-58468 A | 3/2013 | |
| KR | 100975579 B1 | 8/2010 | |

OTHER PUBLICATIONS

International Search Report and Written Opinion dated Apr. 28, 2015 in connection with PCT/JP2015/051867.
Korean Intellectual Property Office, Notification of Reason for Refusal, Application No. 10-2016-7031439, dated Dec. 15, 2017, 8 pages.

* cited by examiner

LIGHT-EMITTING PANEL

CROSS REFERENCE TO RELATED APPLICATIONS

The present application represents the national stage application of International Application PCT/JP2015/051867 filed Jan. 23, 2015, which claims the benefit of Japanese Patent Application 2014-102385 filed May 16, 2014, both of which are hereby incorporated by reference herein in their entirety for all purposes.

TECHNICAL FIELD

The present invention relates to a light-emitting panel mounted on a display device which emits and displays a design of a received positive image film.

BACKGROUND ART

Conventionally, as a display device which emits and displays a design drawn in a positive image film, a display device having a light-emitting panel surface-emitting and back-illuminating the positive image film is well-known (for example, see Patent Literature 1). The light-emitting panel is configured to enter light from a light source such as LED to an edge of a surface light-emitting member which is formed in a rectangular plate shape and made of resin. It sometimes happens that the above surface light-emitting member is stretched due to temperature and humidity at an installation location. For example, an outer dimension is changed for about 0.7% with respect to a temperature change of 10° C. Further, the outer dimension is changed for about 2% with respect to a humidity change. Such temperature and humidity change characteristics results in thermal expansion of the surface light-emitting member when the light-emitting panel is exposed to high temperature and high humidity environment in summer. For this reason, in order to avoid damage of the light source by the pressure caused by such thermal expansion, the light-emitting panel is configured to fix the light source holder for holding the light source to the surface light-emitting member and move the light source together with the surface light-emitting member when the surface light-emitting member is thermal expansion.

CITATION LIST

Patent Literature

[PTL 1] Patent Literature 1: JP 4990952 B

SUMMARY OF INVENTION

Technical Problem

Meanwhile, in the above light-emitting panel, when the light source of LED etc. deteriorates, it is exchanged with a new light source in maintenance. However, since the above light source holder is fixed to the surface light-emitting member so as to prevent thermal expansion of the surface light-emitting member, in many cases the light-emitting panel must be totally disassembled in order to replace the light source. As a result, it has become a burden on a worker.

It is an object of the present invention to provide a light-emitting panel capable of limiting influence on a light source according to thermal expansion of a surface light-emitting member and replacing the light source easily.

Solution to Problem

In order to actives the above object, a light-emitting panel of the present invention includes a light source; a surface light-emitting member having a rectangular plate shape, at least one surface of front and back surfaces being surface-emitted by entering light from the light source into an incident edge; a light source holder for holding the light source such that a light exit of the light source is arranged toward the incident edge; and a holder supporting portion fixed to the surface light-emitting member and detachably supporting the light source holder.

In the light-emitting panel of the present invention, the light source holder is detachably attached to the holder supporting portion in a surface orthogonal direction orthogonal the surface light-emitting member.

In the light-emitting panel of the present invention, the light source holder is screwed to the holder supporting portion in the surface orthogonal direction for the surface light-emitting member.

In the light-emitting panel of the present invention, the holder supporting portion has a fixed portion fixed to the surface light-emitting member and a separation portion integrally formed with the fixed portion and spaced from the incident edge. Further, the light source holder has a holding portion arranged between the incident edge and the separation portion and holding the light source, and a tongue piece portion integrally formed with the holding portion, the tongue piece portion being overlapped in the surface orthogonal direction to the surface light-emitting member and detachably attached to the separation portion.

Advantageous Effects of Invention

According to the present invention, the light source holder is supported by the holder supporting portion which is fixed to the surface light-emitting member. Thereby, when the surface light-emitting member is thermally expanded, the light source holder (namely, light source) together with the holder supporting portion is moved. For this reason, effect on the light source according to thermal expansion of the surface light-emitting member can be reduced. Further, since the light source holder is detachably supported by the holder supporting portion, the light source can be easily replaced by removing the light source holder from the holder supporting portion without totally disassembling the light-emitting panel.

According to the present invention, the light source holder is detachably attached to the holder supporting portion in the surface orthogonal direction to the surface light-emitting member, that is, from a light-emitting surface side of the light-emitting panel (in some cases, back surface side is also possible) which is a direction that a worker can easily perform access. Thereby, workability of replacement of the light source can be improved.

According to the present invention, the light source holder is fixed on the holder supporting portion in the surface orthogonal direction to the surface light-emitting member, that is, the direction that a worked can easily perform access by a screwing method that removable work is simple for the worker. Thereby, workability of replacement of the light source can be further improved.

According to the present invention, in order to attach the light source holder to the holder supporting portion, the separation portion is attached to the tongue piece portion overlapped in the direction orthogonal to the surface light-emitting member, namely the direction in which a worker can easily perform access. Therefore, the light source holder is easily attached and detached to the holder supporting portion, and thereby workability of replacement of the light source can be improved.

DESCRIPTION OF EMBODIMENTS

Figure 1:
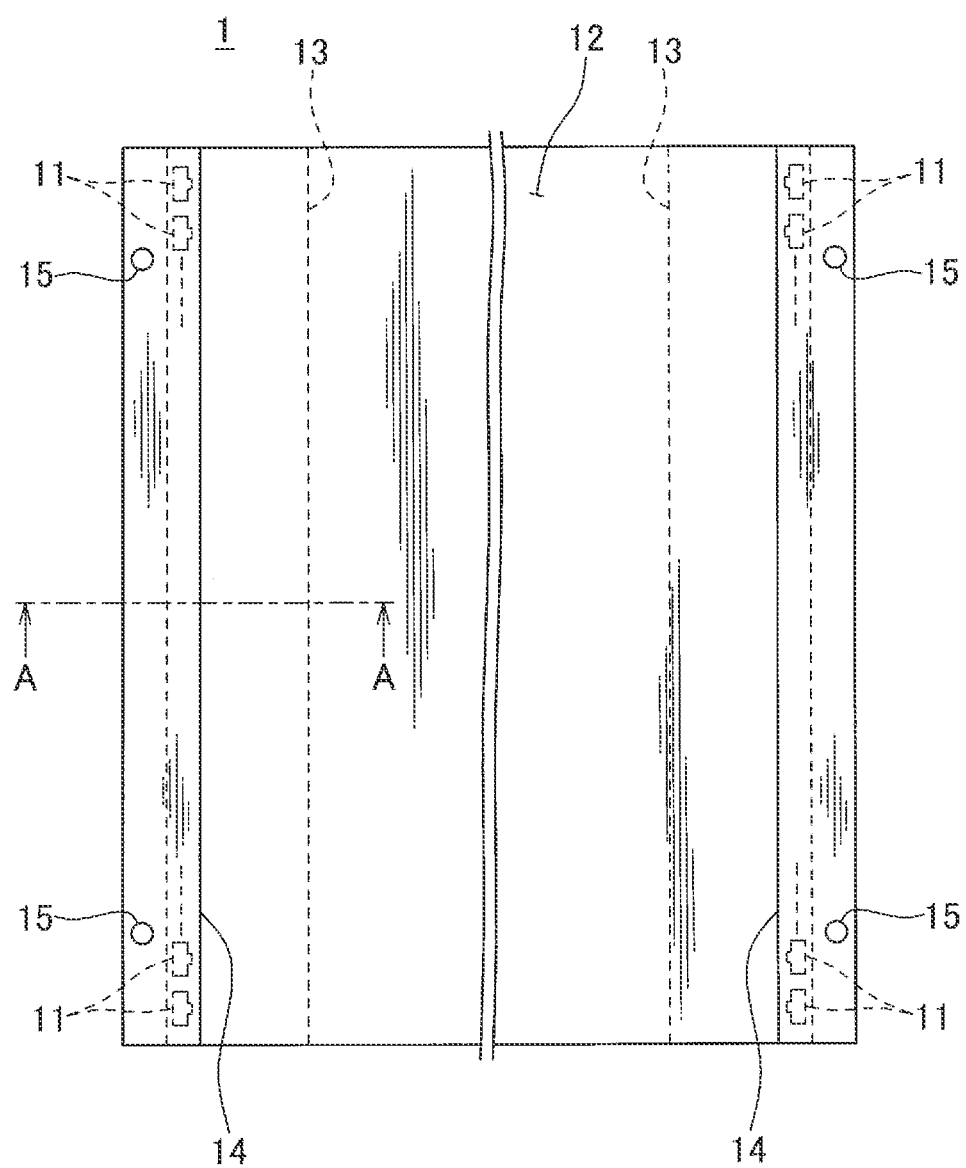
FIG. 1 is a front view seeing a light-emitting panel from a light-emitting surface side according to a first embodiment of the present invention.
Figure 2:
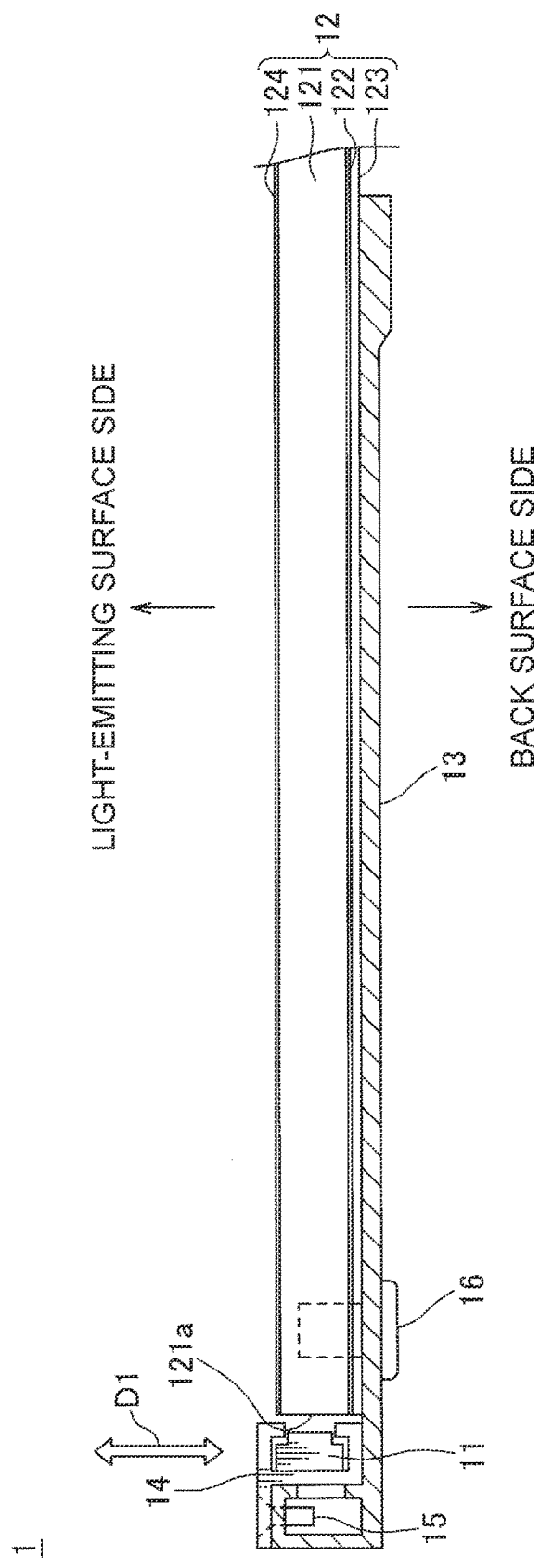
FIG. 2 is a cross-sectional view showing an A-A line cross section of FIG. 1.

A light-emitting panel according to a first embodiment of the present invention will be described with reference to FIGS. 1-4. FIG. 1 is a front view seeing a light-emitting panel from a light-emitting surface side according to the first embodiment of the present invention. FIG. 2 is a cross-sectional view taken along the line A-A line in FIG. 1.

A light-emitting panel 1 shown in FIG. 1 is mounted on a display device (not shown), and is used on back-illumination of a positive image film by surface-emitting. As shown in FIGS. 1 and 2, the light-emitting panel 1 has a LED 11 as a light source, a surface light-emitting member 12, a holder supporting portion 13, and a light source holder 14. The surface light-emitting member 12 has a light guide plate 121, a reflecting sheet 122, a base plate 123, and a milk color sheet 124.

The light guide plate 121 is a rectangular plate made of synthetic resin such as an acrylic resin. In the embodiment of the present invention, the light guide plate 121 has 5 mm thickness. Further, each of a pair of opposing edges in the light guide plate 12 is an incident edge 121a that light from the LED 11 is made incident. In a back surface side of the light guide plate 121 (lower side in FIG. 2), a light guide pattern is formed so as to diffuse and reflect incident light from the incident edge 121a in a light-emitting surface side (upper side in FIG. 2).

The reflecting sheet 122 is overlapped and arranged in the back surface side of the light guide plate 121. Further, the reflecting sheet 122 is a sheet reflecting light emitted from the back surface side into the light-emitting surface side. In the embodiment of the present invention, the reflecting sheet 122 has 0.2 mm thickness, and is a white color sheet.

The base plate 123 is overlapped and arranged in the back surface side of the reflecting sheet 122. Further, the base plate 123 is a metal plate so as to reinforce the strength of the surface light-emitting member 121. In the embodiment of the present invention, the base plate 123 is an aluminum plate having 1.0 mm thickness.

The milk color sheet 124 is overlapped and arranged in the light-emitting surface side of the light guide plate 121. Further, the milk color sheet 124 is a milk color sheet so as to diffuse and transmit light emitted to the light-emitting surface side. In the embodiment of the present invention, the milk color sheet 124 has 0.2 mm thickness. The light-emitting panel 1 is surface-emitted by the transmitted light of the milk color sheet 124.

Figure 3:
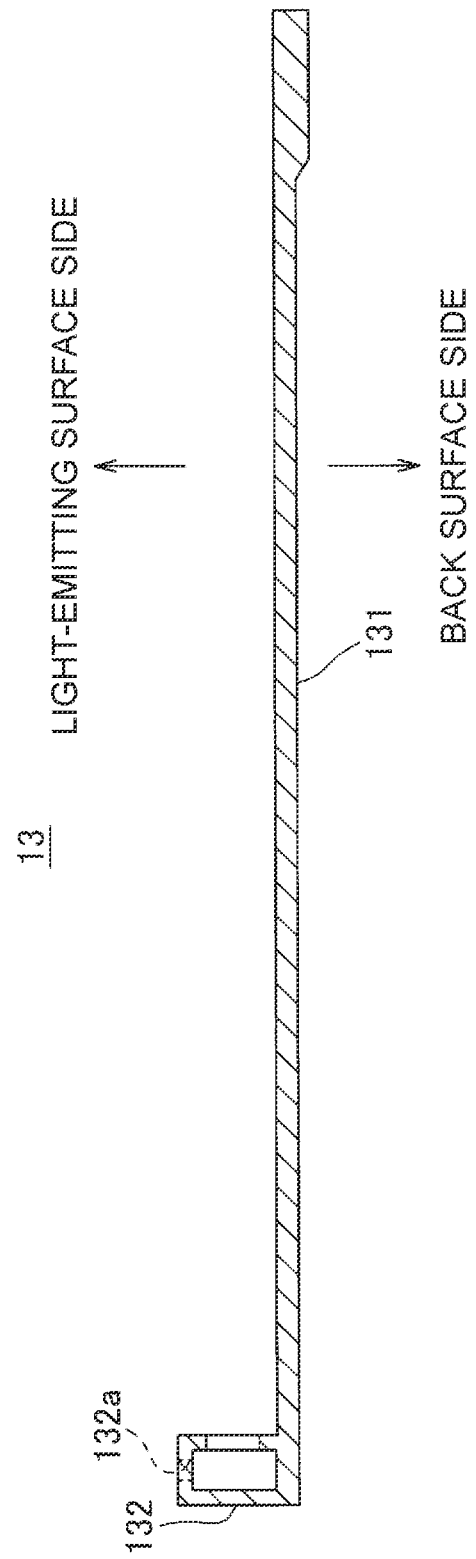
FIG. 3 is a view showing a holder supporting portion shown in FIG. 2.

The holder supporting portion 13 is attached from the back surface side of the surface light-emitting member 12 described above. The holder supporting portion 13 is fixed near the incident edge 121a in the light guide plate 121 of the surface light-emitting member 12 in a state that a part of the holder supporting portion 13 projects on the outside of the surface light-emitting member 12 in-plane direction from the incident edge 121a. FIG. 3 shows the holder supporting portion shown in FIG. 2. As shown in FIG. 3, the holder supporting portion 13 is formed of metal such as aluminum, and has a fixed portion 131 and a separation portion 132.

The fixed portion 131 is formed in a plate shape, and overlapped near the incident edge 121a in the back surface side of the surface light-emitting member 12. A part of the fixed portion 131 projects on the outside of the surface light-emitting member 12 in-plane direction from the incident edge 121a.

In the embodiment of the present invention, a helical insert coil (not shown) as a screw hole is embedded in the light guide plate 121 so as to screw a screw 16, which fixes the fixed portion 131 of the holder supporting portion 13, from the back surface side. Further, a through hole communicating with the screw hole is formed in the reflecting sheet 122, the base plate 123, and the fixed portion 131 of the holder supporting portion 13. As shown in FIG. 2, by screwing the screw 16 passing through the through holes into the screw hole, the fixed portion 131 of the holder supporting portion 13 is fixed to the light guide plate 121 with the reflecting sheet 122 and the base plate 123 sandwiched between the back surface of the light guide plate 121 and the holder supporting portion 13.

The separation portion 132 is erected at the light-emitting surface side of the fixed portion 131 in a part projecting from the incident edge 121a with a space between the incident edge 121a and it that the holding portion described below can be arranged. In the embodiment of the present invention, the separation portion 132 has a rectangular tubular shape, and extends along the whole length of the incident edge 121a parallel to the incident edge 121a. Further, a screw hole 132a is formed in the separation portion 132 at light-emitting surface side so as to screw a countersunk head screw described below.

Figure 4:
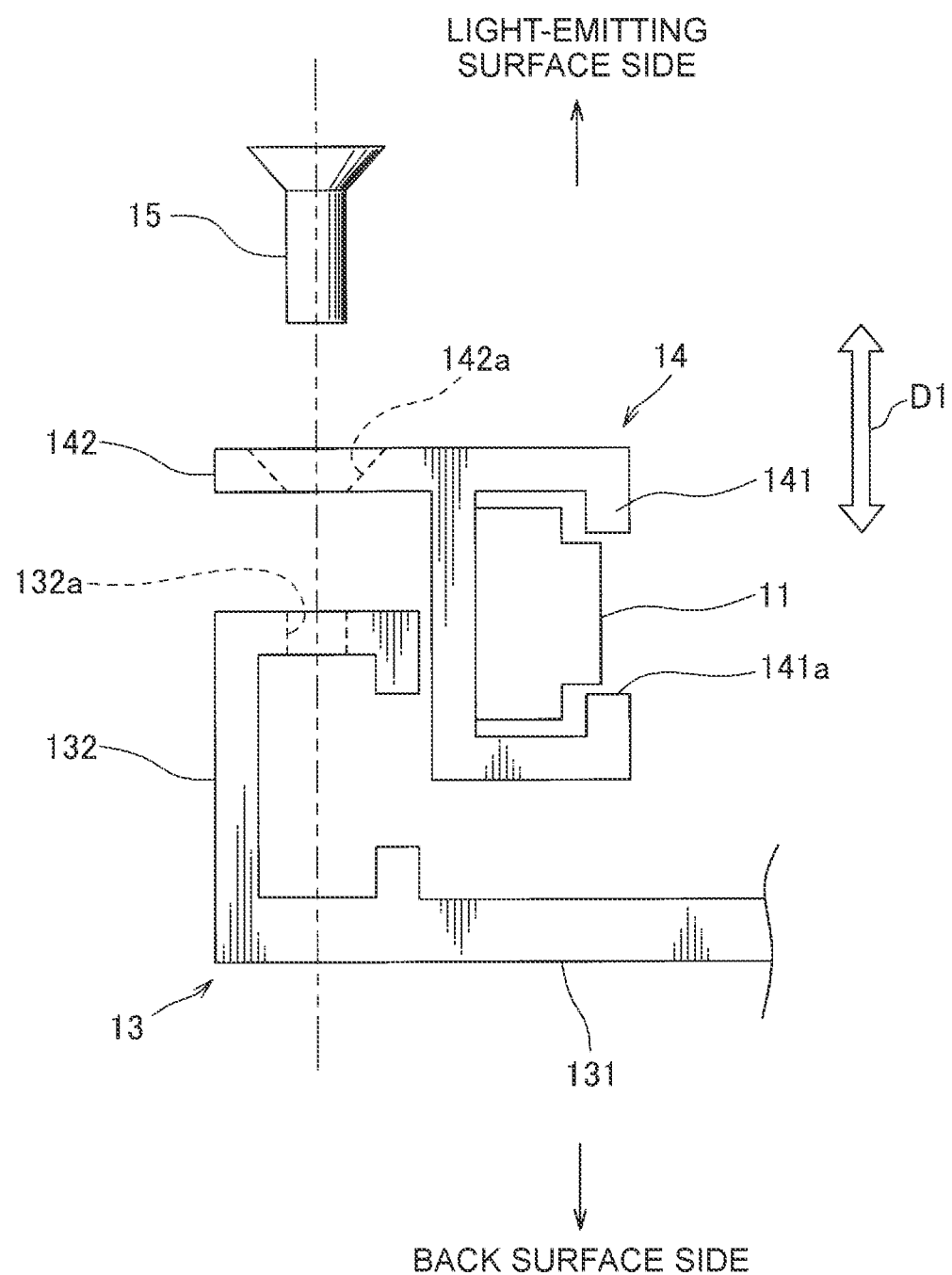
FIG. 4 is a view showing a light source holder shown in FIG. 2.

As shown in FIG. 2, the light source holder 14 holds the LED 11 so that the light exit of the LED 11 is disposed toward the incident edge 121a of the light guide plate 121. Further, the light source holder 14 is detachably supported by the holder supporting portion 13. In the embodiment of the preset invention, the light source holder 14 is detachably arranged on the holder supporting portion 13 in a direction orthogonal to the surface light-emitting member 12 shown in FIG. 2 with an arrow D1. FIG. 4 illustrates the light source holder shown in FIG. 2. The light source holder 14 is made of metal such as aluminum. Further, as shown in FIG. 4, the light source holder 14 has a holding portion 141 and a tongue piece portion 142.

The holding portion 141 is disposed between the incident edge 121a and the separation portion 132 of the holder supporting portion 13, and holds the LED 11 so that the light-emitting port is arranged toward the incident edge 121a. In the embodiment of the present invention, the holding portion 141 has a rectangular tubular shape, and extends along the whole length of the incident edge 121a parallel to the incident edge 121a. Further, an opening 141a is arranged on a side of the incident edge 121a so as to pass light from the LED 11. The holding portion 141 holds a plurality of LEDs 11 to an inside of tubular along the incident edge 121a. In the embodiment of the present invention, the LED 11 is held with one step in a thickness direction of the light guide plate 121. Furthermore, in the embodiment of the present invention, the holding portion 141 is disposed at a space of 0.5 mm from the incident edge 121a. By the space of 0.5 mm, it is possible to attach and detach the holding portion 141 between the incident edge 121a and the separation portion 132 of the holder supporting portion 13 in a direction of the arrow D1.

The tongue piece portion 142 projects from the holding portion 141 to a light-emitting surface side of the separation portion 132, and is overlapped on the separation portion 132 in the direction orthogonal to the surface light-emitting member 12 shown in FIG. 1 with the arrow D1. Further, the tongue piece portion 142 is provided with a funnel-shaped hole 142a. The funnel-shaped hole 142a is communicated with the screw hole 132a of the separation portion 132, and a screw head of the countersunk head screw 15 is embedded thereto. The tongue piece portion 142 is detachably fixed to the separation portion 132 from the light-emitting surface side by the countersunk head screw 15.

In the embodiment of the present invention, the holder supporting portion 13 is fixed to each of the vicinity of a pair of opposed incident edges 121a of the light guide plate 121, and a light source holder 14 is supported in each holder supporting portion 13. Further, light from the LED 11 held in each of the light source holder 14 is incident on each of the incident edge 121a.

According to the light-emitting panel 1 of the first embodiment explained above, the light source holder 14 is supported in the holder supporting portion 13 fixed in the surface light-emitting member 12. Thereby, when the surface light-emitting member 12 is thermally expanded, the light source holder 14 (that is, LED 11) is moved together with the holder supporting portion 13. As a result, effects such as compression of the LED 11 due to thermal expansion of surface light-emitting member 12 can be prevented. Furthermore, since the light source holder 14 is detachably supported to the holder supporting portion 13, the LED 11 can be easily replaced by removing the light source holder 14 from the holder supporting portion 13 without totally disassembling the light-emitting panel 1.

Further, according to the light-emitting panel 1 of the embodiment in the present invention, it is possible to detachably attach the light source holder 14 to the holder supporting portion 13 in the direction (a direction of the arrow D1) orthogonal to the surface light-emitting member 12 which is a light-emitting surface side of the light-emitting panel 1 in the embodiment of the present invention, that is, a direction in which a worker can easily perform access. Thereby, improve workability of replacement of the LED 11 is achieved.

Furthermore, according to the light-emitting panel 1, the light source holder 14 is attached to the holder supporting portion 13 in the direction orthogonal to the surface light-emitting member 12 (the direction of the arrow D1), namely the direction in which a worker can easily perform access, by a screwing method in which a worker can be easily attached and detached. Thereby, workability of replacement of the LED 11 is further improved.

Moreover, according to the light-emitting panel 1 of the embodiment in the present invention, in order to attach the light source holder 14 to the holder supporting portion 13, the separation portion 132 is attached to the tongue piece portion 142 overlapped in the direction orthogonal to the surface light-emitting member 12 (the direction of the arrow D1), namely the direction in which a worker can easily perform access. Therefore, the light source holder 14 is easily attached and detached to the holder supporting portion 13, and thereby improve workability of replacement of the LED 11 is achieved.

Figure 5:
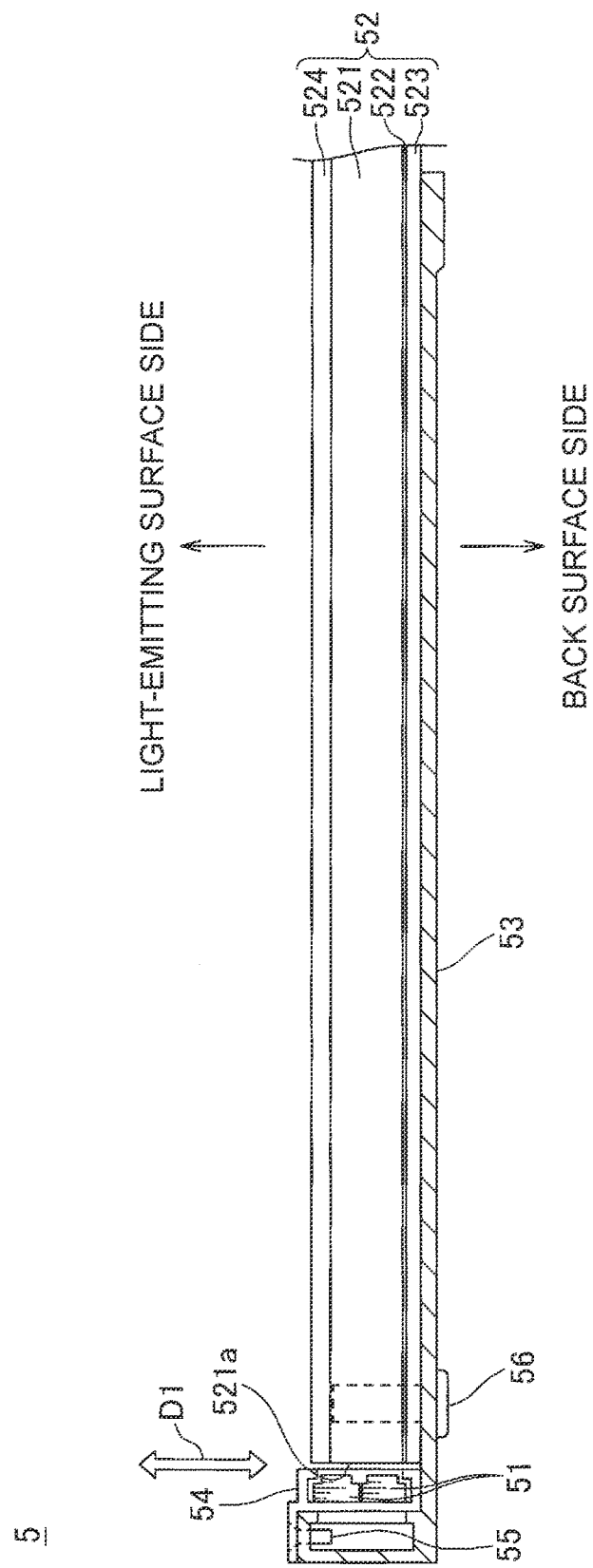
FIG. 5 is a cross-sectional view showing a cross section of the light-emitting panel according to a second embodiment of the present invention similar to the cross section shown in FIG. 2.

Next, a light-emitting panel according to second embodiment of the present invention will be explained with reference to FIGS. 5-7. FIG. 5 is a cross-sectional view showing the cross-section surface of the light-emitting panel of the second embodiment in the present invention similar to the cross-section surface shown in FIG. 2.

In the surface light-emitting member 52 of the light-emitting panel 5 of the second embodiment in the present invention, the light guide plate 521 has 8 mm thickness thicker than the light guide plate 121 of the first embodiment of the present invention shown in FIG. 2. Further, in common with the reflecting sheet 122 of the first embodiment, the reflecting sheet 522 has a 0.2 mm thickness, and is a white color sheet. Meanwhile, the base plate 523 has 1.5 mm thickness thicker than the base plate 123 of the first embodiment. Furthermore, the light-emitting panel 5 has a milk plate 524 having 2.0 mm thickness instead of the milk color sheet 124 of the first embodiment of the present invention on the light-emitting surface side.

In the second embodiment of the present invention, the LED 51 is arranged at two stages in a thickness direction of the light guide plate 521 so that light can fully enter the incident edge 521a of the light guide plate 521 as described above. As with the first embodiment, the mounting of the LED 51 in two stages is performed by the holder supporting portion 53 which is fixed near the incident edge 521a and the light source holder 54 which is detachably attached to the holder supporting portion 53 with the countersunk head screw 55. In the second embodiment of the present invention, the light source holder 54 is freely attached and detached to the holder supporting portion 53 in the direction orthogonal to the surface light-emitting member 52 shown in FIG. 5 with an arrow D1.

Figure 6:
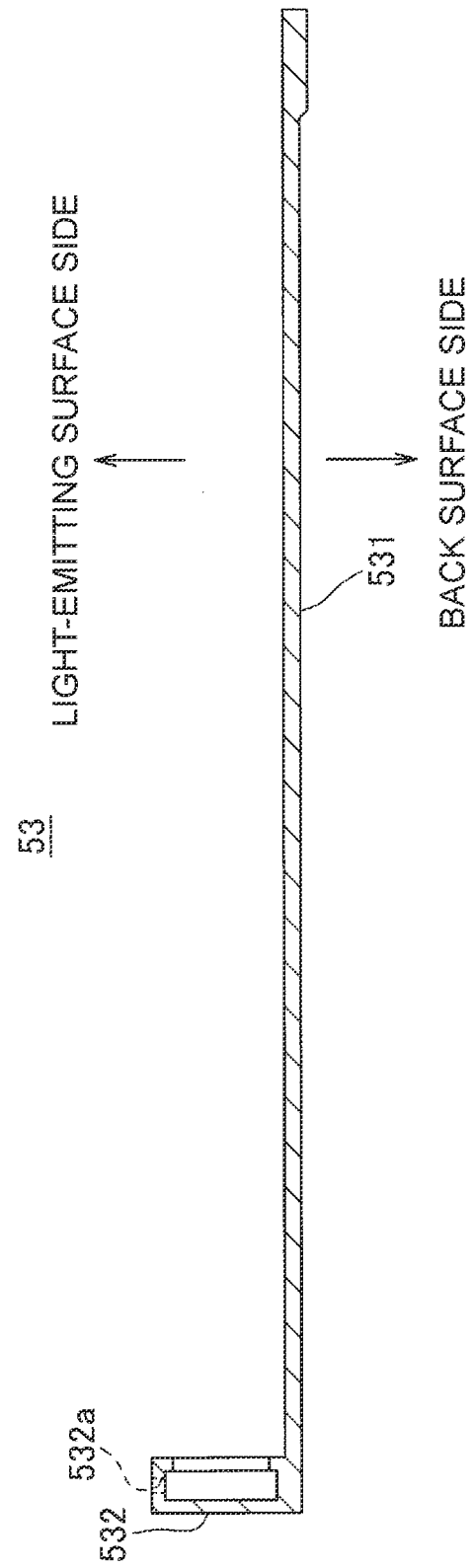
FIG. 6 is a view showing the holder supporting portion shown in FIG. 5.

FIG. 6 shows the holder supporting portion shown in FIG. 5. The holder supporting portion 53 is made of metal such as aluminum. Furthermore, as shown in FIG. 6, the holder supporting portion 53 has the fixed portion 531 and the separation portion 532. The fixed portion 531 is overlapped near the incident edge 521a in the back surface side of the surface light-emitting member 52. A part of the fixed portion 531 projects on the outside of the surface light-emitting member 52 in-plane direction from the incident edge 521a, and is fixed. As shown in FIG. 5, the fixed portion 531 of the holder supporting portion 53 is fixed to the light guide plate 521 by the screw 56 together with the reflecting sheet 522 and the base plate 523 in common with the fixed portion 131 of the first embodiment of the present invention.

The height of the separation portion 532 projecting from the incident edge 521a, standing on a part of the light-emitting surface side, and having a rectangular tubular shape is at a height corresponding to the thick light guide plate 521. In the light-emitting surface side of the separation portion 532, the screw hole 532a is formed so as to screw the countersunk head screw 55 for fixing the light source holder 54.

Figure 7:
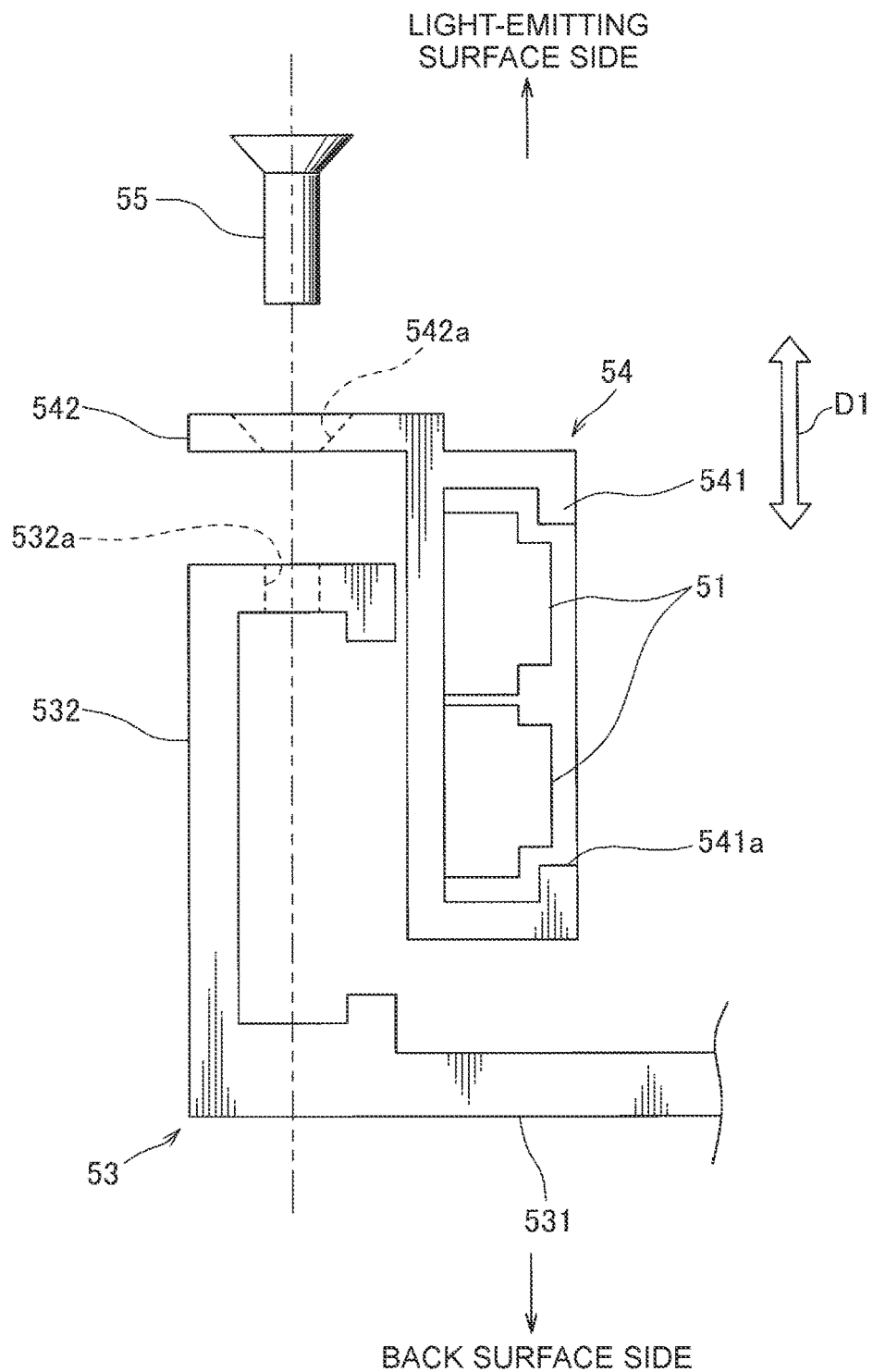
FIG. 7 is a view showing the light source holder shown in FIG. 5.

FIG. 7 shows the light source holder shown in FIG. 5. The light source holder 54 is made of metal such as aluminum. Further, as shown in FIG. 7, the light source holder 54 has the holding portion 541 and the tongue piece portion 542.

As shown in FIG. 5, the holding portion 541 is disposed between the incident edge 521a and the separation portion 532 of the holder supporting portion 53, and holds the LED 51 so that the light-emitting port is arranged toward the incident edge 521a. In the second embodiment of the present invention, the holding portion 541 arranges a plurality of LEDs 51 along the incident edge 521a and holds them. Furthermore, as described above, the holding portion 541 holds the LEDs 51 at two stages in the thickness direction of the light guide plate 521. The holding portion 541 is formed a rectangular tubular shape having a height in which the LEDs can be held in two stages, and has the opening 541a on the side of the incident edge 521a so as to pass light from the LED 51 of two stages. Further, in the second embodiment as with the first embodiment, the holding portion 541 is arranged at a space of 0.5 mm from the incident edge 521a. Thereby, it is possible to attach and detach the holding portion 541 between the incident edge 521a and the separation portion 532 of the holder supporting portion 53 in a direction of the arrow D1.

The tongue piece portion 542 projects from the holding portion 541 to a light-emitting surface side of the separation portion 532, and is overlapped on the separation portion 532 in the direction orthogonal to the surface light-emitting member 12 shown with the arrow D1. Further, the tongue piece portion 542 is provided with the funnel-shaped hole 532a of the separation portion 532. The funnel-shaped hole 532a is communicated with the screw hole 532a of the separation portion 532. The tongue piece portion 542 is detachably fixed to the separation portion 532 from the light-emitting surface side by the countersunk head screw 55.

In the second embodiment similar to the first embodiment, the holder supporting portion 53 is fixed to each of the vicinity of a pair of opposed incident edges 521a of the light guide plate 521, and the light source holder 54 is fixed to each of the holder supporting portion 53. Further, light from the LED 51 held in each of the light source holder 54 is incident on each of the incident edge 521a.

According to the light-emitting panel 5 of the second embodiment explained above, in common with the light-emitting panel 1 of the first embodiment, effects such as compression of the LED 51 due to thermal expansion of the light guide plate 521. Further, it is possible to easily replace the LED 51 by removing the light source holder 54 from the holder supporting portion 53. Furthermore, the replacement of the LED 51 is performed with access in the direction orthogonal to the surface light-emitting member 52, that is, from the light-emitting surface side, and the tongue piece portion 542 is screwed to the separation portion 532. Thereby, in common with the light-emitting panel 1 of the first embodiment, workability of replacement of the LED 51 can be improved.

The above-described embodiments merely indicate representative modes of the invention, and the invention is not restricted to the embodiments. That is, those skilled in the art may variously modify and implement the embodiments within a range not departing from a subject matter of the invention according to conventionally known knowledge. When a configuration of the light-emitting panel of the invention is included by the modification, the modification is fall under the category of the invention.

For example, in the above two embodiments, the light-emitting panel of the present invention which arranges the holder supporting portion and the light source holder near of each of the incident edge of light from the light source being a pair of opposed edges in the light guide plate having a rectangular plate shape is illustrated as one example. However, the light-emitting panel of the present invention is not limited to such embodiment. For example, the holder supporting portion and the light source holder may be arranged near an incident edge being any one of the edges of the light guide plate. Alternatively, the holder supporting portion and the light source holder may be arranged near each of an incident edge being three edges of the light guide plate or all four edges thereof.

Further, in the above two embodiments, specific size and materials are illustrated for the thickness and material of each component of the light guide plate. However, size and materials of each component in the light-emitting panel of the present invention is not limited thereto.

Furthermore, in the above two embodiments, the surface light-emitting members 12, 52 of one surface emission type are illustrated as one example of the surface light-emitting member of the present invention. However, the surface light-emitting member of the present invention is not limited thereto. For example, it may be of a double-sided light-emitting type.

Moreover, in the above two embodiments, the holder supporting portions 13, 14 which are fixed in a state superimposed on the back surface side of the surface light-emitting member are illustrated as one example of the holder supporting portion of the present invention. However, the holder supporting portion of the present invention is not limited thereto. For example, an arm portion extending toward side edges of the surface light-emitting member may be arranged and fixed to the side edges thereof. If the holder supporting portion is fixed in this way, the light source holder can be attached and detached from both directions of the light-emitting surface side the light-emitting panel and the back surface side thereof.

Furthermore, in the above two embodiments, the holder supporting portions 13, 53 in which the separation portions 132, 532 are stood and the light source holders 14, 54 which are overlapped on the separation portions 132, 532 are illustrated as one example of the holder supporting portion and the light source holder. However, the holder supporting portion and the light source holder of the present invention are not limited thereto. For example, the holder supporting portion may be a simple plate partially protruding from the incident edge of the surface light-emitting member, and the light source holder may be a simple rectangular tube without arranging the tongue piece such as described above. If the holder supporting portion and the light source holder are provided in this way, the light source holder may be attached to a portion protruding from the incident edge on the holder supporting portion by screws.

REFERENCE SIGNS LIST 1, 5 light-emitting panel
11, 51 LED
12, 52 surface light-emitting member
13, 53 holder supporting portion
14, 54 light source holder
15, 55 countersunk head screw
16, 56 screw 121a, 521a incident edge
131, 531 fixed portion
132, 532 separation portion
141, 541 holding portion
142, 542 tongue piece portion

The invention claimed is:

1. A light-emitting panel comprising:
a light source;
a surface light-emitting member having a rectangular plate shape, at least one surface of front and back surfaces being surface-emitted by entering light from the light source into an incident edge;
a light source holder for holding the light source such that a light exit of the light source is arranged toward the incident edge; and
a holder supporting portion fixed to the surface light-emitting member and detachably supporting the light source holder,
wherein the holder supporting portion has a fixed portion fixed to the surface light-emitting member and a rectangular tubular shaped separation portion integrally formed with the fixed portion and spaced from the incident edge, and
wherein the light source holder has a rectangular tubular shaped holding portion arranged between the incident edge and the separation portion and holding the light source, and a tongue piece portion integrally formed with the holding portion, the tongue piece portion being overlapped in the surface orthogonal direction to the surface light-emitting member and detachably attached to the separation portion.

2. The light-emitting panel according to claim 1, wherein the light source holder is detachably attached to the holder supporting portion in a surface orthogonal direction orthogonal to the surface light-emitting member.

3. The light-emitting panel according to claim 1, wherein the light source holder is screwed to the holder supporting portion in the surface orthogonal direction for the surface light-emitting member.

* * * * *

UNITED STATES PATENT AND TRADEMARK OFFICE
CERTIFICATE OF CORRECTION

| | |
|---|---|
| PATENT NO. | : 10,254,473 B2 |
| APPLICATION NO. | : 15/311393 |
| DATED | : April 9, 2019 |
| INVENTOR(S) | : Hirokazu Matsui |

It is certified that error appears in the above-identified patent and that said Letters Patent is hereby corrected as shown below:

In the Specification

Column 2, Line 19, "the surface" should be --to the surface--.

Signed and Sealed this
Twenty-eighth Day of May, 2019

Andrei Iancu
*Director of the United States Patent and Trademark Office*